United States Patent [19]

Levine et al.

[11] 3,915,560

[45] Oct. 28, 1975

[54] FINE FOCUS ASSEMBLY

[75] Inventors: Marshall S. Levine, Wayne, Pa.;
Ralph Z. Jorden, Pennsauken, N.J.

[73] Assignee: Geometric Data Corporation, Wayne, Pa.

[22] Filed: Mar. 1, 1974

[21] Appl. No.: 447,128

[52] U.S. Cl. .................... 350/255; 350/41; 350/46; 350/47
[51] Int. Cl.[2] .......................................... G02B 7/02
[58] Field of Search ......... 350/255, 41, 46, 47, 287, 350/253; 354/195; 310/9.1, 9.4, 9.6, 8, 8.1

[56] References Cited
UNITED STATES PATENTS

| | | | |
|---|---|---|---|
| 2,706,326 | 4/1955 | Mason | 310/8 X |
| 3,016,464 | 1/1962 | Bailey | 350/255 X |
| 3,583,792 | 6/1971 | Jones | 350/255 |
| 3,585,416 | 6/1971 | Mellen | 310/8.1 |

Primary Examiner—Ronald L. Wibert
Assistant Examiner—Paul K. Godwin
Attorney, Agent, or Firm—Caesar, Rivise, Bernstein & Cohen

[57] ABSTRACT

A fine focus assembly for an optical instrument is disclosed which includes a housing, a lens holding means and translation means for moving the lens holding means with respect to the housing. A planar spring member is provided which extends transversely to the longitudinal axis of relative movement of the lens holding means with respect to the housing. The housing is fixedly secured to the spring member and the lens holding means is fixedly secured to the spring but spaced from the securement of the housing. A portion of the spring member is deflected transversely to its plane when the translation means provides a force for moving the lens holding means with respect to the housing. In addition, means are provided which are responsive to the amount of deflection for sensing the translation of the lens holding means with respect to the housing so that the fine focus assembly can be automatically, accurately and remotely controlled.

10 Claims, 10 Drawing Figures

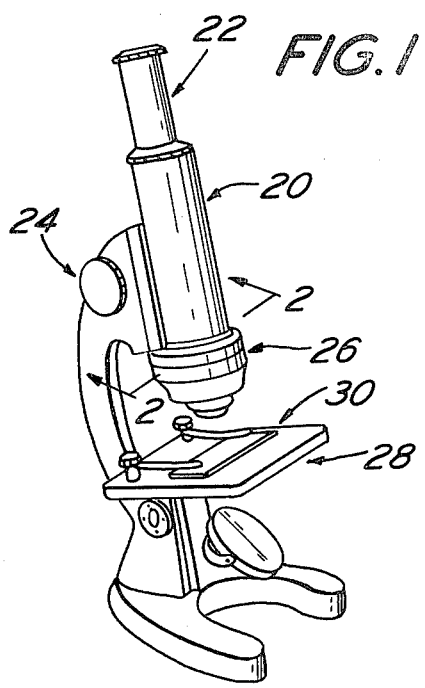
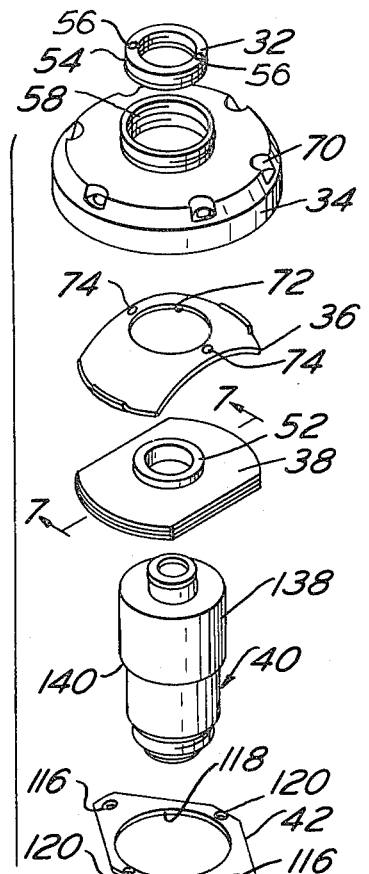
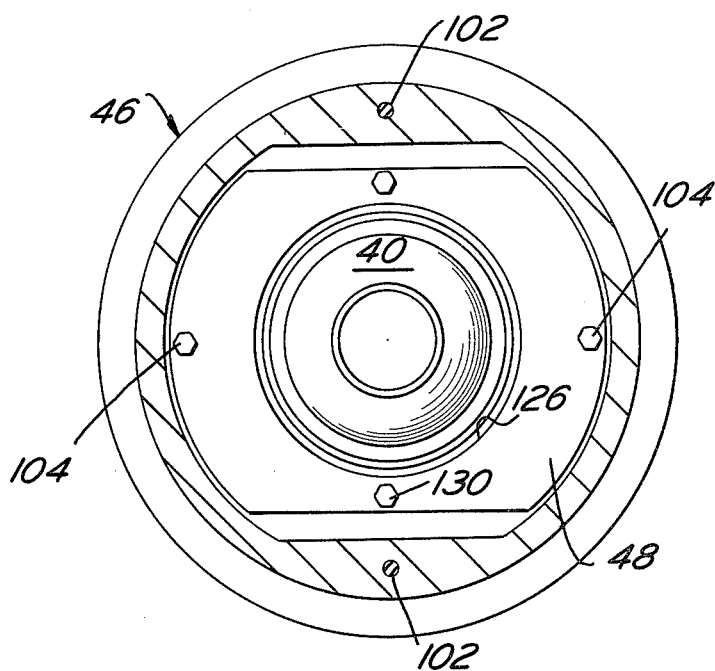
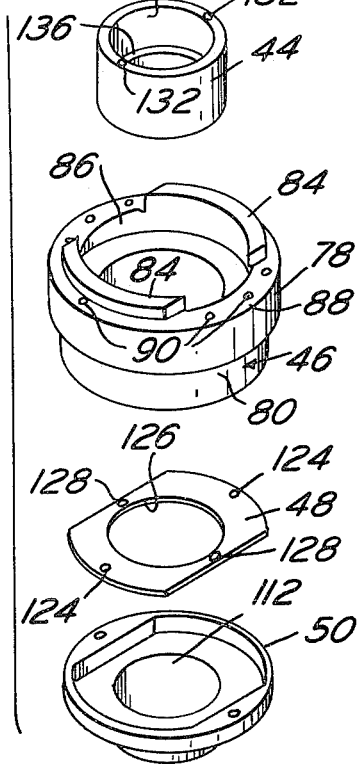

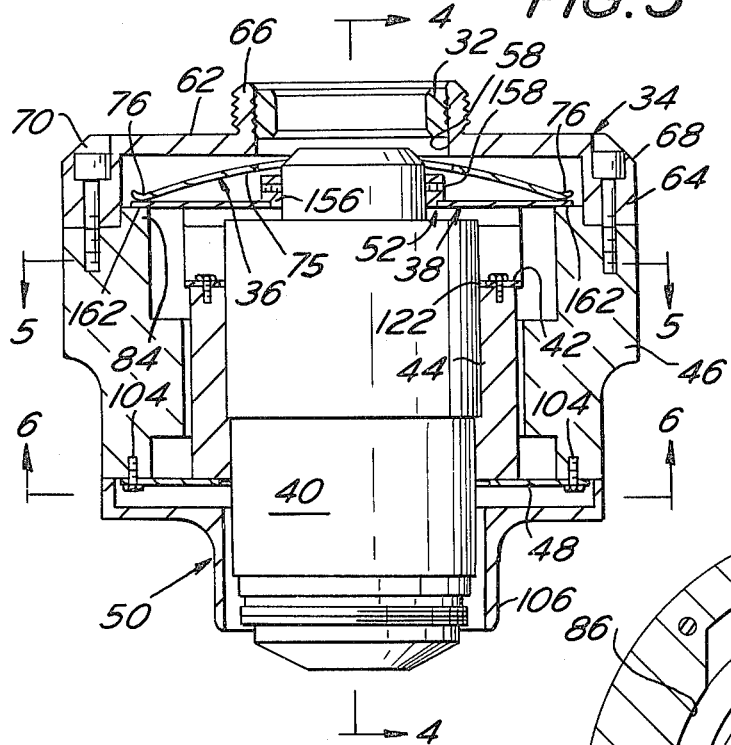
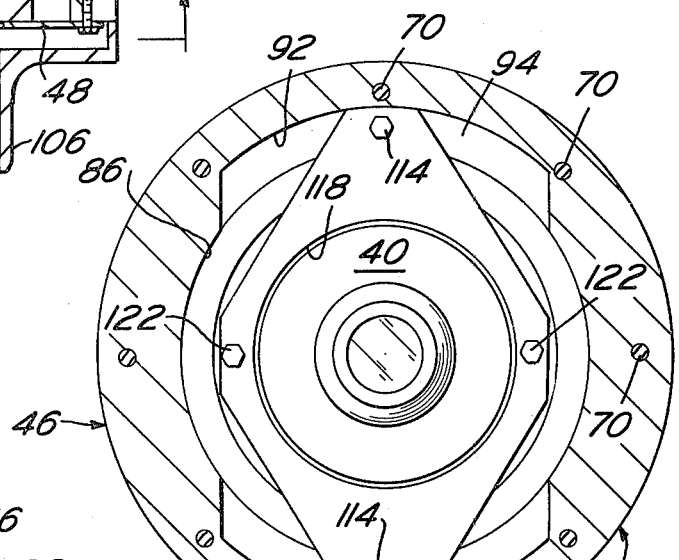
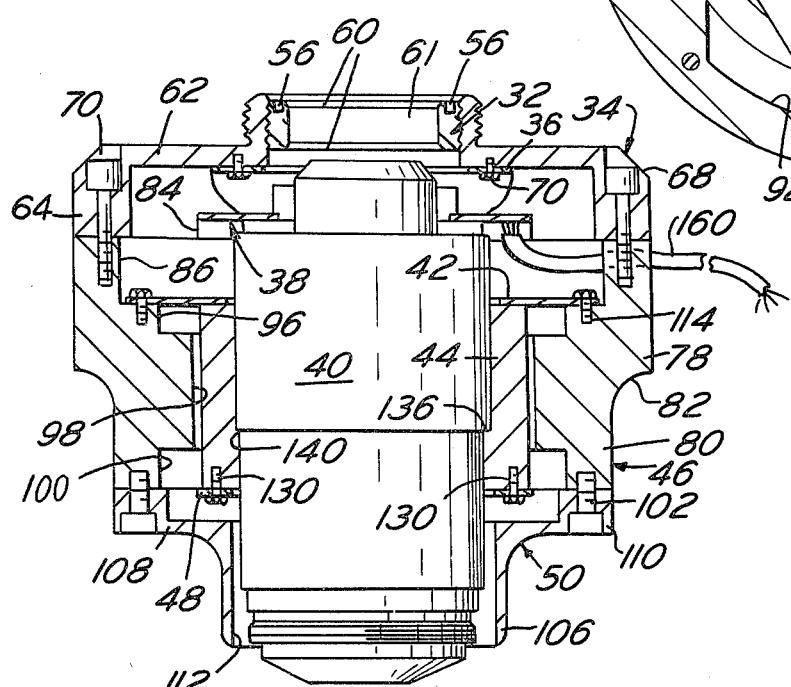

FINE FOCUS ASSEMBLY

This invention relates generally to optical instruments and more particularly to a fine focus assembly for an optical instrument which can be focused automatically, remotely controlled and most importantly focused with extreme accuracy.

In the field of optical instruments which are used in automatic devices such as microscopes utilized in pattern and character recognition systems, there has developed a need for automatically focusing a microscope with extremely small tolerance. That is, in a microscope used for biological studies, it is not unusual to require focusing accuracy within a half micron. Moreover, it has been found that in automatic systems, where the human eye is not used, the focusing is much more critical than with a human observer. That is, the eye can tolerate a slightly out of focus microscope because of the fact that the eye can adjust. However, in an automatic system, such as a character or pattern recognition system, the system must be in substantially exact focus.

It has been found that conventional approaches for moving either the objective or eyepiece lenses in a microscope assembly are inadequate in view of the fact that mechanical linkages have too much give. That is, a gear mechanism has too much slack when attempting to move a lens assembly in discrete units in the order of microns. Moreover, the slack in most mechanical linkages also causes a hysteresis effect when reversing the direction of movement of the lens assembly. Thus, not only is it difficult to provide the exact translation to a lens required to bring the lens into focus, but it is also difficult to determine whether such translation has been achieved by the means for moving the assembly into focus.

It is therefore an object of this invention to overcome the problems experienced in the prior art.

Another object of the invention is to provide a fine focus assembly which enables extremely fine focusing.

Still another object of the invention is to provide a new and improved fine focus assembly which enables translation of a lens assembly in order to bring the optical instrument into focus.

Yet another object of the invention is to provide a new and improved optical instrument which includes a fine focusing assembly which provides means for translating a lens assembly with respect to the remainder of the optical instrument and detecting means for determining the amount of translation.

Still another object of the invention is to provide a new and improved optical instrument which includes a Piezoelectric crystal controlled fine focus assembly.

These and other objects of the invention are achieved by providing a new and improved fine focus assembly for an optical instrument. The assembly includes a housing, lens holding means and translation means for moving the lens holding means with respect to the housing. A planar spring member is also provided which extends transversely to the longitudinal axis of relative movement of the lens holding means with respect to the housing. The lens holding means is mounted centrally of the spring means with the periphery thereof secured to the housing. The spring means is deflected at the center thereof out of the plane of the spring. The assembly further includes translation sensing means which provide an indication of the movement of the objective so that the amount of translation that has taken place can be measured.

These and other objects of the invention can be readily appreciated as the same becomes better understood by reference to the following detailed description when considered in connection with the accompanying drawings wherein:

FIG. 1 is a perspective view of a microscope embodying the invention;

FIG. 2 is an exploded enlarged perspective view of the fine focus assembly embodying the invention with wiring removed for purposes of clarity;

FIG. 3 is an enlarged elevational view with portions shown in vertical section of the fine focus assembly embodying the invention;

FIG. 4 is a sectional view taken along the line 4—4 in FIG. 3 with the lens assembly shown in full for purposes of clarity;

FIG. 5 is a sectional view taken along the line 5—5 in FIG. 3;

FIG. 6 is a sectional view taken along the line 6—6 of FIG. 3;

Figure 7:
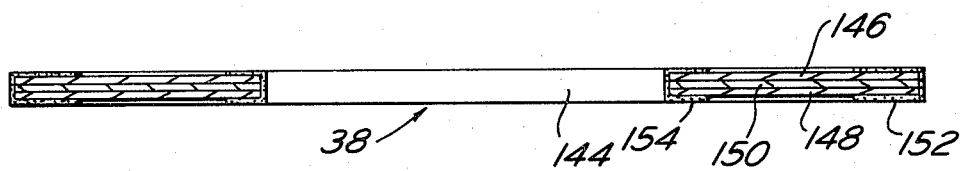
FIG. 7 is an enlarged sectional view taken along the line 7—7 in FIG. 2.

Referring now in greater detail to the various figures of the drawings wherein like reference numerals refer to like parts a microscope embodying the invention is shown generally at 20 in FIG. 1. The microscope 20 includes inter alia, an eyepiece 22, a coarse focusing knob 24, a fine focusing assembly 26, a stage 28 and a slide 30 supported by stage 28 which is positioned for examination in the microscope.

The microscope 20 is focused by turning the coarse focusing knob 24 until the object on slide 30 is brought as close to focus as it possible using the coarse knob 24. The fine focus assembly 26 is then utilized to move the objective lens in increments in the order of a micron in order to obtain focus of the microscope of the object examined on slide 30 within a half micron.

The fine focus assembly 26 includes an annular stop 32, an upper portion 34 of the housing for the fine focus assembly, a Piezoelectric cyrstal assembly 38, an objective lens assembly 40, an upper mounting spring 42, a lens holder 44, a lower portion 46 of the housing for the fine focus assembly, a lower mounting spring 48, a lens shield 50 and a crystal mounting ring 52 which is secured to the crystal assembly 38.

The stop 32 is generally cylindrical in shape and includes a threaded outersurface 54 and is best seen in FIG. 4, a pair of shallow narrow diameter recesses 56 to enable rotation of the stop for securement in the threaded bore 58 of upper portion 34 of the housing for the fine focus assembly. As is also seen best in FIG. 4, the stop 32 includes chamfered edges 60 at each end of the cylindrical bore 61 of stop 32.

As best seen in FIGS. 3 and 4, the upper portion 34 of the housing basically comprises a circular plate 62 having a peripheral depending shirt 64 and an upwardly projecting boss 66. The bore 58 of the upper portion 34 is reduced within the plate 62 and the boss 66. The bore extends axially through the upper portion 34 and within bore 66 and skirt 64, the bore coaxial with the housing. The outer surface of bore 66 is threaded so that it can be threadedly secured to the barrel of a microscope.

The upper portion 34 including a chamferred edge 68 which extends about the periphery of the upper portion 34 and acts to provide a smooth edge in the transition between plate 62 and depending skirt 64. Provided about the periphery and extending through the chamfered surface 68 and the depending skirt 64 are a plurality of openings 70 which are enlarged at the upper end thereof to enable receipt for a headed threaded fastener for securement of the upper portion 34 to the lower portion 46.

As best seen in FIG. 4, the lowermost surface of plate 62 includes a pair of openings which are threaded for receipt of a pair of threaded fasteners 70 for securement of spring 36 to the lowermost surface of the plate 62 of the upper portion 34. As best seen in FIGS. 2 and 4, spring 36 includes a circular opening 72 at the center thereof with a pair of smaller openings 74 diametrically opposed from each other about opening 72 and provided substantially at the center of the spring 36.

As best seen in FIG. 3, the spring 36 is preferably a leaf spring which is normally arcuately shaped at its central portion 75 with its ends 76 being bent back up in a small U-Shape. The opening 72 is provided at the center of the central portion 75 of the spring. As best seen in FIG. 4, the threaded fasteners 70 extend through openings 74 to secure the spring 36 to the lower surface of plate 62 of upper portion 34 of the housing. As will hereinafter be seen, the spring 74 acts to maintain the crystal 38 against the top surface of the lower portion 46 and to provide additional spring pressure to resiliently resist the objective lens assembly from being moved upwardly when the lowermost edge of the objective lens abuts either a stage or a glass slide.

The lower portion 46 of the housing is best seen in FIGS. 2, 3, 4 and 5. The lower portion 46 is basically cylindrical and includes an enlarged portion 78 and a reduced portion 80 which are connected together by an upwardly flared portion 82. As seen in FIG. 4, the enlarged portion 78 of the upper portion 46 of the housing is of substantially the same outer periphery so that the joined portion of the upper and lower portion includes a smooth outer surface.

The lower portion 46 also includes a pair of upstanding arcuate flanges 84 (see FIG. 2) which extend about a portion of the periphery of cylindrical bore 86 of lower portion 46. The flanges 84 are diametrically opposed from each other and the curvatures thereof are coaxial so that they form a portion of a cylinder. The flanges 84 fit within the portion of the bore within the depending skirt 64 of the upper portion 34.

As best seen in FIGS. 3 and 4, the crystal assembly 38 rests on flanges 84. The flanges 84 extend upwardly from a planar surface 88 which extends in a plane transverse to the axis of the lower portion 46.

A plurality of openings 90 extend through the surface 88 and are provided for the receipt of threaded fasteners for securement of the upper portion to the lower portion. As best seen in FIG. 5, the bore 86 of lower portion 46 is irregularly shaped as it extends axially through the lower portion. That is, bore 86 is largest at the uppermost end of the bore where it includes a pair of diametrically opposed radially extending recesses 92 which enlarge the bore.

The lowermost surface of the recesses 92 is a horizontal planar surface 94 to which the upper mounting spring 42 is secured. As best seen in FIG. 4, below surface 94 of bore 86 the bore is cylindrical at portion 96 thereof and the bore is reduced at 98 and again enlarges at portion 100 which is substantially the same diameter as portion 96. The axis of the cylindrical portion of the bore 86 is coaxial with the axis of the fine focusing assembly.

The lowermost surface of the lower portion 46 is substantially planar and includes a plurality of openings for receipt of fasteners 102 which secure the lens shields 50 to the bottom of the lower portion of the housing. Openings are also provided for the receipt of threaded fasteners 104 (see FIG. 3) which are utilized to secure lower mounting spring 48 to the lower portion of the housing.

The lens shield 50 is best seen in FIGS. 2, 3 and 4. The lens shield basically comprises a cylindrical portion 106 and a circular plate which extends radially from the outer periphery of the cylindrical portion and an upstanding circular flange 110 which extends peripherally about the plate 108. The upstanding flange 110 includes a plurality of openings which extend therethrough to accomodate the fasteners 102 which connect the shield 50 to the bottom of the lower portion 46. The shield 50 includes an axially extending bore 112 which extends through the shield 50 and which is narrowest through the cylindrical portion 106 and largest in the cylindrical portion 110. The bore within flange 110 accomodates the mounting of the lower mounting spring 48.

The upper mounting spring 42 and the lower mounting spring 48 both comprise leaf springs and are normally planar. The spring 42, as best seen in FIG. 5, is secured to the lower portion 46 of the housing. As set forth above, the spring 42 has its ends resting on surfaces 94 and the ends are secured to the housing by a pair of threaded fasteners 114 which extend through openings 116 (see FIG. 2) in the ends of spring 42. Spring 42 includes a circular opening at the center thereof through which the objective lens assembly 40 extends.

Spring 42, which is somewhat diamond-shaped, also includes a pair of openings 120 which are provided along the center of the spring 42 on diametrically opposed sides of the opening 118. As best seen in FIG. 3, openings 120 accomodate a pair of fasteners 112 which extend through the opening to secure the spring 42 to the lens holder 44. The plane of the leaf spring 42 is normally transverse to the axis of the lens assembly 40. The lens assembly extends through the opening 118 in the spring. However, the lens assembly moves with spring 42 in view of the fact that lens holder 44 is secured to the spring. Thus, when the lens assembly moves axially with respect to the housing 46, the spring 42 is deflected with the center thereof along the line defined by openings 120 moving with the holder while the end portions of the spring at openings 116 remain stationary with respect to the housing.

Similarly, mounting spring 48, which is of a circular shape with two diametrically opposed sectors removed, is otherwise similarly constructed with respect to spring 42. Spring 48 is a leaf spring having a pair of end openings 124 which accomodate a pair of threaded fasteners 104 which secure the ends of spring 48 to the lowermost end of the lower portion 46 of the housing. Spring 48 also includes a center opening 126 which is also circular and which is surrounded by a pair of central openings 128 which are diametrically opposed about opening 118 on opposite sides of the center of the spring 48. The openings 128 accommodate a pair of threaded fasteners 130 which are used to secure the central portion of spring 148 to the holder 44 (see FIG. 4).

It should be noted that the spring 48 is also normally planar and extends transversely to the axis of the lens assembly. In addition, the springs 42 and 48 are displaced 90° with respect to each other. That is, in FIG. 3 the spring 48 can be seen fastened to the lower portion 46 by fasteners 104, whereas the fastening of the spring 48 to the holder 44 cannot be seen. On the other hand, spring 42 can be seen attached at its center to the holder 44 while the attachment to the lower portion 46 is hidden by the objective lens assembly 40. However, as seen in FIG. 4, which is taken at a view 90° from that of FIG. 3, the spring 42 is shown to be secured at its ends from left to right to the lower portion 46 while the connection of the spring 42 to the holder 44 is hidden by the objective lens assembly 40. Similarly, the spring 48 is shown connected to the holder 44 by threaded fasteners 130 while the end fasteners 104 are hidden by the objective lens assembly 40.

As best seen in FIGS. 2, 3 and 4, the lens holder 44 basically comprises a cylindrical sleeve having a pair of axially extending openings 132 provided on diametrically opposed sides of a cylindrical bore which extends axially through the lens holder 44. The openings 132 receive the fasteners 122 for securement of spring 42 to the top surface of the lens holder 44. A pair of openings which are best seen in FIG. 4 threadedly receive fasteners 130 at the bottom end of the holder 44. As best seen in FIG. 2, and FIG. 4, the bore 134 of lens holder 44 includes a shoulder 136 which, as hereinafter will be seen, supports the weights of the objective lens assembly 40.

The lens assembly 40 is held in a generally cylindrical jacket 138. Jacket 138 of the lens assembly 40 includes a shoulder 140 which, as best seen in FIG. 4, rests on shoulder 136 in the bore of lens holder 44. It should be noted that the objective lens assembly 40 is maintained in the holder 44 by a pre-loading force which includes the weight of the lens assembly 40 plus any biasing forces added by the maintaining of the lens assembly. The lens assembly 40 is slideable with respect to the holder when a force in the direction of arrow 142 in FIG. 4 is applied to the lens assembly 40 which is greater than the weight of the assembly. The slideability of the lens assembly with respect to the holder 44 is a safety feature to prevent cracking the objective lens when the bottom surface of the lens assembly 40 abuts the surface of either the slide 30 or the stage 28.

When no force or a force less than the pre-loading force active on the lens assembly is applied to the lens assembly 40, such as that shown by arrow 142 in FIG. 4, lens assembly 40 moves with holder 44 and is supported by surface 136 of the lens holder 44.

Figure 8:
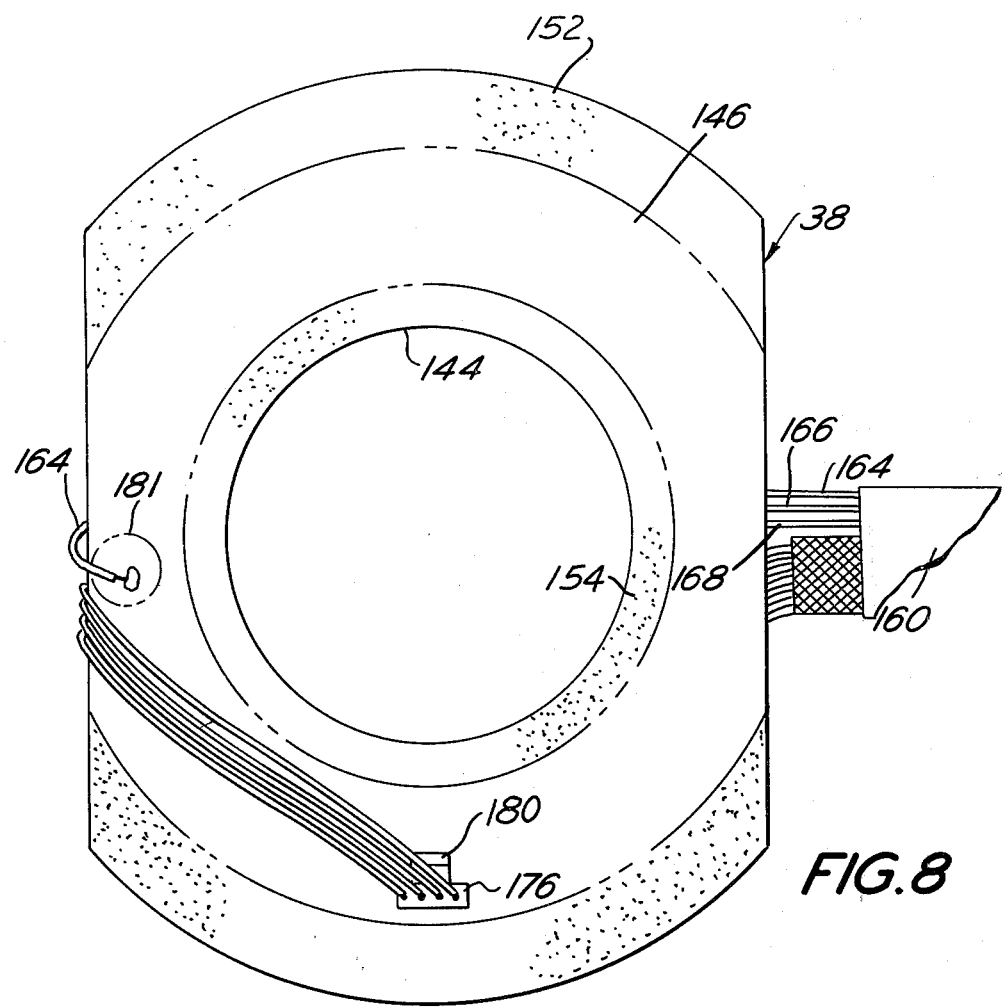
FIG. 8 is an enlarged top plan view of the crystal used in the fine focus assembly with associated wiring attached thereto.
Figure 9:
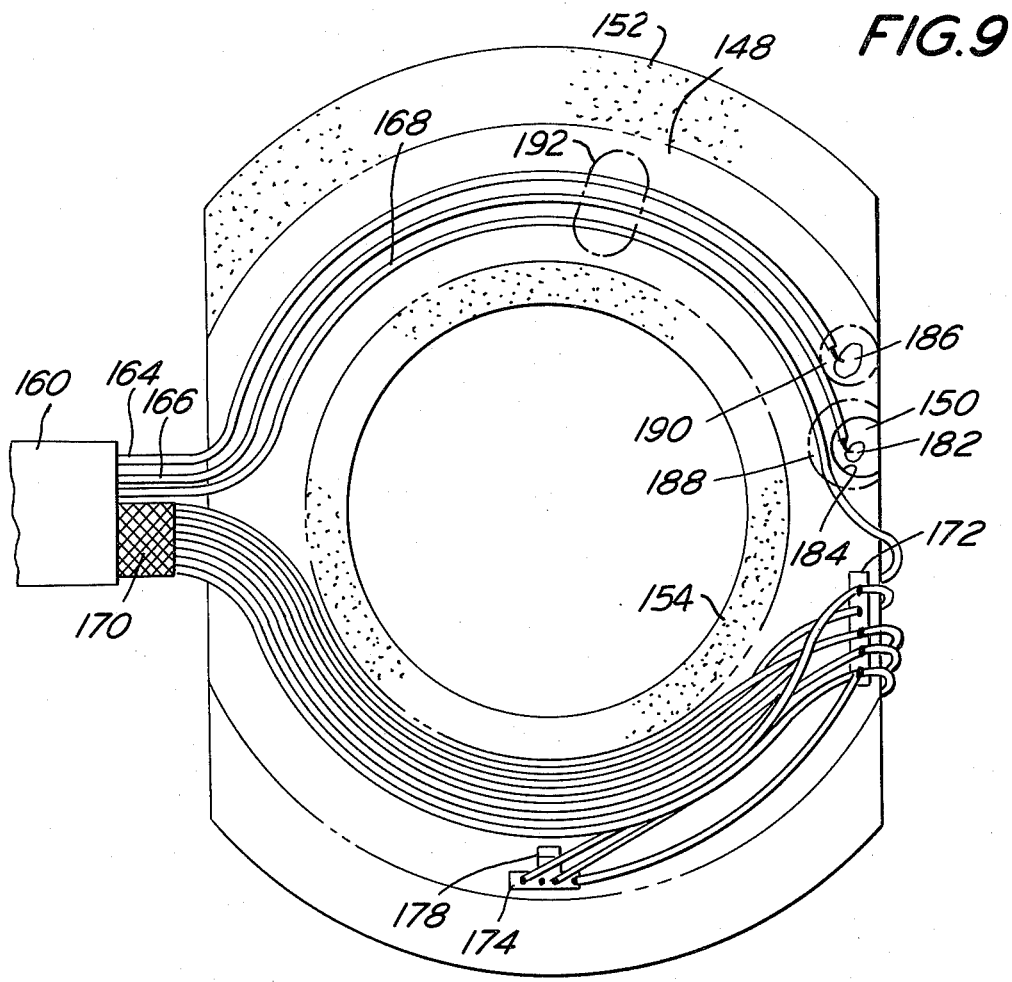
FIG. 9 is a bottom plan view of the crystal shown in FIG. 8.

The crystal assembly 38, as best seen in FIGS. 2, 8 and 9, is circularly shaped with a pair of sectors on diametrically opposed sides of the crystal assembly removed. The crystal assembly includes a circular opening 144 at the center thereof. As best seen in FIG. 7, the crystal assembly includes a pair of piezoelectric crystal layers 146 and 148 which sandwich a brass vane 160. An epoxy coating is provided about the periphery of the crystal assembly 38 to seal the edges at 152. Similarly, an epoxy coating is provided at 154 about the periphery of opening 144 to seal the remaining edges of the crystal layers and brass vane.

As best seen in FIGS. 2, 3 and 4, the crystal mounting ring 52 is adhesively secured, preferably by an epoxy resin, to the crystal assembly within opening 144. As best seen in FIG. 3, the mounting ring 52 includes a depending boss 156 which extends into the opening within the crystal assembly 38. The ring also includes a pair of radially extending threaded openings in which are provided threaded fasteners 158 which are provided to secure the ring to the lens assembly 40.

As best seen in FIG. 4, the crystal assembly 38 is connected to an electrical input source via cable 160. As will also hereinafter be seen, sensors are provided on the surface of crystal assembly 38 which are also connected via wires in cable 160 to suitable electrical devices for determining the amount of movement or location of the objective lens assembly 40.

As best seen in FIG. 3, the crystal assembly 38 is supported by its ends 162 on the top surface of the flanges 84 of the lower portion 46 of the housing. The application of voltage to the crystal assembly 38 via cable 160 causes the crystal assembly 38 to be bent arcuately with the center of the crystal assembly 38 being elevated in accordance with the amount of voltage applied to the crystal assembly. That is, the greater the voltage the greater that the center of the crystal assembly 38 is elevated and therefore the more that the objective lens assembly 40 is elevated as the greater voltage is applied to the crystal assembly 38.

It should be understood that the objective assembly 40 moves with the holder 44 in view of the fact that the holder 44, due to the pre-loading force on the jacket of the objective lens assembly 40 has biased the center of springs 42 and 48 downwardly prior to the application of voltage to the crystal assembly 38. As long as the objective lens assembly moves with the holder 44, there is no frictional engagement between the objective lens assembly and the lens holder 44 and the housing of the fine focus assembly.

This means that there is no force such as friction working against the movement of the objective lens assembly. The only parts that are interengaged between the lens holder 44 and the housing, are the springs 42 and 48 which are deflected at their center portion with respect to the housing. Accordingly, there is no hysteresis effect when the voltage has been reduced and the objective lens assembly moves in the opposite direction. The hysteresis loss is eliminated substantially because of the fact that there is no frictional engagement prior to movement of the objective lens assembly with respect to the housing. Any hysteresis effect that is caused by the deflection of the springs 42 and 48 is extremely small with respect to frictional hysteresis.

The crystal assembly 38 is best shown in FIGS. 7, 8 and 9 where it is seen prior to the securement of the mounting ring 52 to the crystal 38. As seen in FIGS. 8 and 9, the cable 160 includes a plurality of power wires 164, 166 and 168 which provide the voltages to the layers of the crystal assembly which enable the crystal assembly to be bent in accordance with the amount of voltage applied thereon. The crystal assembly, as seen hereinabove, acts as a translation means for moving the objective lens.

Also provided within cable 160 are a plurality of shielded leads 170 which are connected to terminal strips 172 and 174, as seen in FIG. 9, and terminal strip 176, as seen in FIG. 8. Adjacent terminal strip 174, as seen in FIG. 9, a pair of strain gauges 178 are secured to crystal layer 148 and are electrically connected to the various terminals of terminal strip 174. Adjacent terminal strip 176, as seen in FIG. 8, a pair of strain gauges 180 are secured to crystal layer 146 which are electrically connected to the various terminals of terminal strip 176. The terminal strips, as well as the strain gauges 178 and 180, are suitably adhered to the outer surface of the crystal layers 146 and 148.

Lead 164 of the power leads is connected to the outer surface of crystal surface 146 by soldering the lead to the outer surface thereof. A thin layer of epoxy 180 is applied over the solder and the exposed portion of lead 164 so that the junction between the lead 164 and the outer surface of the crystal is suitably insulated. On the bottom side of the crystal, lead 166 is soldered to the brass vane 150 at 182. The brass vane 150 is exposed by an opening 184 which is provided in the crystal layer 148. Lead 164 is soldered to the outer surface of the crystal layer 148 at 186. Both the soldering connections at 182 and 186 are covered by a thin layer of epoxy 188 and 190, respectively, which act to insulate the soldered connection. In addition, the leads 164, 166 and 168 are physically secured, though not electrically connected to the crystal layer 148 by a thin coat or layer of epoxy 192.

Lead 164 provides a positive voltage which varies in accordance with the amount of movement of the objective lens required. Lead 166, which is connected to the brass vane is grounded and the lead 168 carries negative voltage in accordance with the amount of movement required in the objective lens assembly.

It has been found from experimentation that it is preferred that only leads 164 and 166 be used to impart the required movement to the objective lens assembly 40. That is, with positive voltage provided to the lower crystal, the lower crystal layer will contract with respect to the brass vane, thereby causing the center 75 of the crystal assembly 38, as shown in FIGS. 3 and 4, to move upwardly. It should be understood, however, that leads 166 and 168 may be used without lead 164 by applying the negative voltage to the top layer of the crystal and thereby causing an enlargement of the crystal layer 146 with respect to the brass vane and thereby causing a bending which causes the center of the crystal assembly 38 to be moved upwardly.

The strain gauges 178 and 180 are mounted to the crystal layers so that, as the longitudinal axis of the crystal assembly bends, the resistances of the gauges 178 and 180 vary in accordance with the amount of bending of the assembly.

Figure 10:
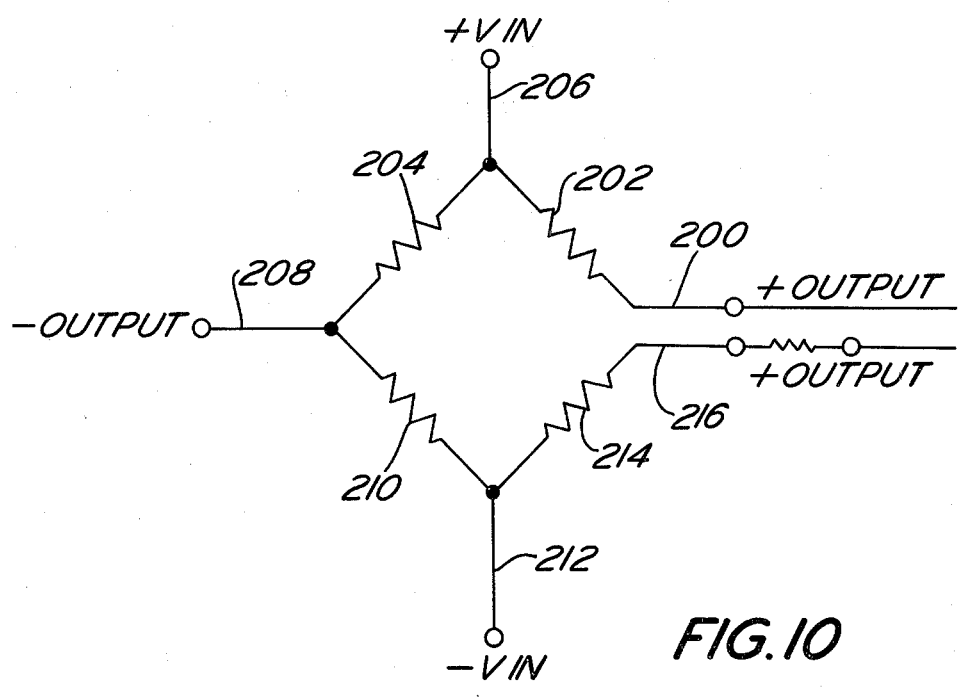
FIG. 10 is a schematic wiring diagram for the strain gauges used on the crystal.

Referring to FIG. 10, a schematic wiring diagram is provided to show the connection of input leads and output leads to strain gauges 178 and 180. The positive voltage output lead 200 is connected to resistor 202 which represents one of the strain gauges which is in turn connected to strain gauge 204 which represents the other of the strain gauges 178. The positive voltage input lead 206 is connected to the juncture of strain gauges 202 and 204, the negative output line 208 is connected to the juncture between the strain gauges 204 and 210, the negative voltage input line 212 is connected to the juncture between strain gauges 210 and strain gauge 214 and the positive output line 216 is connected to the other end of strain gauge 216. The strain gauges 202, 204, 210 and 214 of the pairs of strain gauges 178 and 180 are connected in a Wheatstone bridge configuration so that variations of the impedance in the strain gauges represented by resistors 202, 204, 210 and 214 in FIG. 10 in accordance with the stretching or contracting of the strain gauges provides output signals on lines 200, 208 and 216 which vary directly in proportion with the amount of bending of the crystal assembly. Thus, with appropriate electrical circuitry these signals can be utilized to determine the amount of movement of the objective lens 40 to assure that the objective lens has been moved as required.

In operation the fine focus assembly 26 enables extremely close focusing by enabling movement of the lens assembly 40 in increments as small as one-sixteenth of a micron. The cable 160 provides signals to the crystal which are varied in accordance with the amount of movement desired for the objective lens. Thus, as voltage is increased at the line that is connected to crystal layer 148, the contraction of the crystal layer 148, with respect to vane 150, causes the bending of the crystal 38 so that the center thereof is lifted with respect to the ends of the crystal. Thus, the objective lens assembly 40 is lifted with respect to the housing comprised of portions 34 and 46. The springs 42 and 48 are deflected at their center portions as they follow the lens assembly 40 which is held by and moves with the lens holder 44. It should be remembered that the pre-load of the objective lens assembly and the holder 44 pre-bias the springs 42 and 44 to a lower position so that as the crystal assembly elevates the lens, the springs 42 and 48 urge the holder 44 to follow the lens assembly.

If it is intended that the lens assembly 40 be lowered, the voltage on the input line connected to the lower crystal layer 148 is decreased thereby reducing the amount of contraction of the crystal layer with the vane of the crystal 38. The objective lens is thereby lowered as the crystal assembly is flattened.

The amount of movement of the lens assembly 40 with respect to the housing is accurately measured by the strain gauges 178 and 180. That is, as the crystal layers 146 and 148 expand and contract, the strain gauges 178 and 180 are reduced or increased in resistance in accordance therewith. That is, when the surface of the crystal layer increases, the resistance of the strain gauge also increases. When the crystal layer contracts the resistance of the gauges connected thereto decreases. As seen in FIG. 10, the connection of the strain gauges in a Wheatstone bridge configuration causes changes in the voltage signals on the output lines 200, 208 and 216 which vary in accordance with the bending of the crystal assembly. These signals are utilized to maintain an accurate indication of the total movement of the objective lens assembly 40.

it should also be noted that the only mechanical interconnection between the lens assembly 40 and the holder 44 therefor and the housing of the fine focus assembly in the pair of springs 42 and 48. There is no frictional engagement between the holder 44 and the housing and thus, the only interaction between the holder 44 which moves with the objective lens and the housing is in the deflection of the springs 42 and 48. Accordingly, there is a substantially negligible hysteresis effect as a result of this interaction in view of the fact that there is substantially no frictional lag when the direction of movement of the objective lens assembly is changed.

The spring 36 serves a dual function. Not only does it maintain crystal 38 in place on the top surface of the lower portion 36 of the housing, but it also biases the lens assembly 40 downwardly so that if the objective lens should abut the stage or a slide on the stage of a microscope, the lens assembly has a spring bias to prevent the objective lens assembly from being jarred against the upper wall of the fine focus assembly. Stop 32 is provided so that the lens of the objective lens assembly is not contacted, but rather the stop 32 abuts the crystal assembly upwardly.

As set forth above, the objective lens assembly is supported by the shoulder 146 of the lens holder 44. When the lens assembly abuts the stage, the objective lens assembly can slide upwardly out of the lens holder 44. Accordingly, undue stress is not placed on the springs 42 and 48.

It can therefore be seen that a new and improved fine focus assembly has been provided. The invention enables extra fine focusing while providing the user thereof with accurate information indicative of the movement of the fine focus assembly so that the assembly can be used with automatic focusing systems. The crystal movement enables extra small increments of movement to be imparted to the fine focus assembly. This enables focusing to be extremely accurate. Moreover, the system overcomes through the provision of mounting springs, the acute problem of hysteresis effects in the movement of the lens assembly with respect to the housing.

In addition, the mounting springs enable quick response of the lens assembly to the translation forces of the crystal assembly. Thus, the movement of the lens assembly is affected very quickly. The mounting springs also enable the movement of the objective lens assembly to be repeatable. Also, very linear translation of the lens assembly is achieved because mis-alignment from cocking is avoid. Finally, all of the above can be achieved from very fine control.

The piezoelectric crystal also provides advantages to the system by utilizing a substantial amount of energy to translate the objective lens assembly. Moreover, very little heat is dissipated at the crystal assembly and there is, therefore, too little heat to cause any deterioration of the lens assembly.

Another extremely important advantage of the piezoelectric crystal is the small time constant inherent in the crystal which enables extremely quick response to a change in voltage applied thereto. Also the mounting of the piezoelectric crystal provides inherent accident protection by enabling the objective lens assembly to be moved out of the lens holder if the assembly abuts the stage of the microscope.

Finally, the securement arrangement of the mounting springs 42 and 48 to the housing and to the lens holder 44 enables maximum spacing along the springs between the housing and the lens holder. That is, maximum separation along the spring enables a maximum amount of movement of the holder with respect to the housing. This is accomplished by securing the ends of the springs to the housing and securing the holding means only at the center of the springs. The opening 118 and 126 of the mounting springs enable the objective lens assembly to extend through the springs and yet enables the holder to be secured to the spring at the center of the springs.

Without further elaboration, the foregoing will so fully illustrate our invention that others may, by applying current or future knowledge, readily adapt the same for use under various conditions of service.

What is claimed as the invention is:

1. A fine focus assembly for an optical instrument having a housing, a lens holding means for supporting a movable lens assembly and translation means for moving said lens holding means with respect to said housing, said translation means comprising a crystal assembly having at least one crystal layer and a brass vane which extends transversely to the longitudinal axis of said lens assembly, said crystal layer assembly being supported at its ends by said housing and being secured at the center thereof to said lens assembly, said crystal assembly being connected to a source of voltage which causes expansion and contraction of said crystal layer with respect to said brass vane for causing a bending of said crystal which produces a translation of said lens assembly with respect to said housing.

2. The fine focus assembly of claim 1 and further including an arcuate spring member, said spring member being connected at the center thereof to the top wall of said housing, said arcuate spring member further including a pair of ends which are disposed on the ends of said crystal assembly for maintaining said crystal assembly in place, said holding means for said lens assembly enabling relative movement of said lens assembly with respect to said lens holding means when a vertical force is applied to the lowermost edge of the lens assembly which overcomes the gravitational and spring force applied to the lens assembly so that said lens assembly will not be crushed by abutment against a solid surface below said optical instrument.

3. The fine focus assembly of claim 1 and further including means responsive to said translation means for measuring the amount of relative movement of said lens assembly with respect to said housing.

4. The fine focus assembly of claim 3 wherein said means responsive includes at least one strain gauge which is secured to the surface of said crystal assembly.

5. The fine focus assembly of claim 4 wherein a plurality of said strain gauges are secured to the surface of said crystal assembly and said gauges are connected in a Wheatstone bridge configuration.

6. A fine focus assembly for an optical instrument, said assembly including a housing, lens holding means, translation means for moving the lens holding means with respect to said housing, a planar spring member, said spring member extending transversely to the longitudinal axis of relative movement of said lens holding means with respect to said housing, said housing being fixedly secured to said spring member and said lens holding means being fixedly secured to said spring but spaced from the securement of said housing, a portion of said spring member being deflected transversely to its plane when the translation means provides a force for moving the lens holding means with respect to said housing and means responsive to translation of said lens holding means for determination of the extent of movement of said lens assembly.

7. A fine focus assembly for an optical instrument, said assembly including a housing, lens holding means, translation means for moving the lens holding means with respect to said housing, a planar spring member, said spring member extending transversely to the longitudinal axis of relative movement of said lens holding means with respect to said housing, said housing being fixedly secured to said spring member and said lens holding means being fixedly secured to said spring but spaced from the securement of said housing, a portion of said spring member being deflected transversely to its plane when the translation means provides a force for moving the lens holding means with respect to said housing, said translation means comprising a crystal assembly, said crystal assembly being supported at its ends by said housing and a lens mounted in said lens holding means being secured centrally of said crystal assembly whereby said lens is translated with respect to said housing by the bending of said crystal assembly.

8. The fine focus assembly of claim 7 wherein said crystal assembly comprises a brass vane and at least one layer of piezoelectric crystal, said crystal being bent by the application of a potential across said crystal layer and said brass vane, said bend of said crystal assembly being proportional to the amount of voltage applied across said crystal assembly.

9. A fine focus assembly for an optical instrument, said assembly including a housing, lens holding means, translation means for moving the lens holding means with respect to said housing, a planar spring member, said spring member extending transversely to the longitudinal axis of relative movement of said lens holding means with respect to said housing, said planar spring member being secured at its ends to said housing. and to said lens holding means at the center thereof only along an axis extending transverse to said longitudinal axis of relative movement of said lens holding means and extending transverse to a straight line extending between said ends, a portion of said spring member being deflected transversely to its plane when the translation means provides a force for moving the lens holding means with respect to said housing.

10. A fine focus assembly for an optical instrument, said assembly including a housing, lens holding means, translation means for moving the lens holding means with respect to said housing, a planar spring member, said spring member extending transversely to the longitudinal axis of relative movement of said lens holding means with respect to said housing, a second planar spring member which extends transversely to the longitudinal axis of relative movement of the lens holding means with respect to said housing, said first named spring member being secured to one end of said lens holding means and said second spring member being secured to the other end of said lens holding means, said planar spring members being secured at their respective ends to said housing and to said lens holding means at the respective centers thereof, straight line extending between the secured ends of said first named and said second planar spring members are angularly displaced 90° with respect to each other about the longitudinal axis of relative movement of the lens holding means with respect to the housing, a portion of said spring members being deflected transversely to their plane when the translation means provides a force for moving the lens holding means with respect to said housing.

* * * * *